(12) United States Patent
Kleinatland et al.

(10) Patent No.: US 11,375,704 B2
(45) Date of Patent: Jul. 5, 2022

(54) BAIT CONTAINER ASSEMBLY

(71) Applicants: David Kleinatland, Bay Minette, AL (US); Laura Brothers, Bay Minette, AL (US)

(72) Inventors: David Kleinatland, Bay Minette, AL (US); Laura Brothers, Bay Minette, AL (US)

(*) Notice: Subject to any disclaimer, the term of this patent is extended or adjusted under 35 U.S.C. 154(b) by 9 days.

(21) Appl. No.: 16/952,165

(22) Filed: Nov. 19, 2020

(65) Prior Publication Data

US 2022/0151213 A1 May 19, 2022

(51) Int. Cl.
*A01K 97/04* (2006.01)

(52) U.S. Cl.
CPC ........ *A01K 97/04* (2013.01); *A01K 2227/703* (2013.01)

(58) Field of Classification Search
CPC ............... A01K 97/04; A01K 2227/703
See application file for complete search history.

(56) References Cited

U.S. PATENT DOCUMENTS

| | | | | |
|---|---|---|---|---|
| 1,587,785 A * | 6/1926 | Marsh | ................. | A01K 97/04 43/56 |
| 2,257,879 A | 10/1941 | Graham | | |
| 2,484,122 A | 10/1949 | Ross | | |
| 2,620,588 A * | 12/1952 | Critser | ................. | A01K 97/04 43/55 |
| 2,849,828 A | 9/1958 | Johnson | | |
| 3,193,966 A | 7/1965 | Lawson | | |
| D303,563 S | 9/1989 | Palmer | | |
| 6,820,364 B1 * | 11/2004 | Tyson | ................. | A01K 97/04 220/735 |
| 9,615,563 B2 | 4/2017 | Fontaine | | |
| 9,918,460 B2 * | 3/2018 | Paquette | ................. | A01K 97/05 |
| 11,161,649 B2 * | 11/2021 | Silsby | ................. | A47J 45/067 |
| 2016/0120162 A1 * | 5/2016 | Copper | ................. | A01K 97/05 43/56 |
| 2020/0120914 A1 | 4/2020 | Gniffke | | |

* cited by examiner

*Primary Examiner* — Joshua E Rodden
*Assistant Examiner* — Henry Hooper Mudd (57) ABSTRACT

A bait container assembly for sifting worms from dirt includes a tube, which defines an interior space and which has opposed ends that are open. Each of a pair of lids is hingedly engaged to a respective opposed end of the tube. The lid is selectively engageable to the tube to close the respective opposed end. A grate engaged to the tube defines a pair of compartments within the interior space. The grate sifts worms from dirt positioned in one of the compartments upon inversion of the tube.

12 Claims, 7 Drawing Sheets

BAIT CONTAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to container assemblies and more particularly pertains to a new container assembly for sifting worms from dirt.

(2) Description of Related Art Including Information Disclosed Under 37 CFR 1.97 and 1.98

The prior art relates to container assemblies for fishing bait, and in particular worms. Prior art container assemblies may comprise containers for minnows having strainers, containers having a spiked axle or rotating screw positioned therethrough for lifting worms to a surface of dirt positioned in the containers, and containers accessible from opposing faces.

BRIEF SUMMARY OF THE INVENTION

An embodiment of the disclosure meets the needs presented above by generally comprising a tube, which defines an interior space and which has opposed ends that are open. Each of a pair of lids is hingedly engaged to a respective opposed end of the tube. The lid is selectively engageable to the tube to close the respective opposed end. A grate engaged to the tube defines a pair of compartments within the interior space. The grate is configured to sift worms from dirt positioned in one of the compartments upon inversion of the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new container assembly embodying the principles and concepts of an embodiment of the disclosure and generally designated by the reference numeral 10 will be described.

As best illustrated in FIGS. 1 through 7, the bait container assembly 10 generally comprises a tube 12, which defines an interior space 14 and which has opposed ends 16 that are open. The tube 12 may be cylindrical, as shown in FIGS. 1-7, although the present invention anticipated the tube 12 being alternately shaped, such as, but not limited to, rectangularly box shaped, ovally shaped (when viewed from a respective opposed end 16 of the tube 12), and the like.

Figure 2:
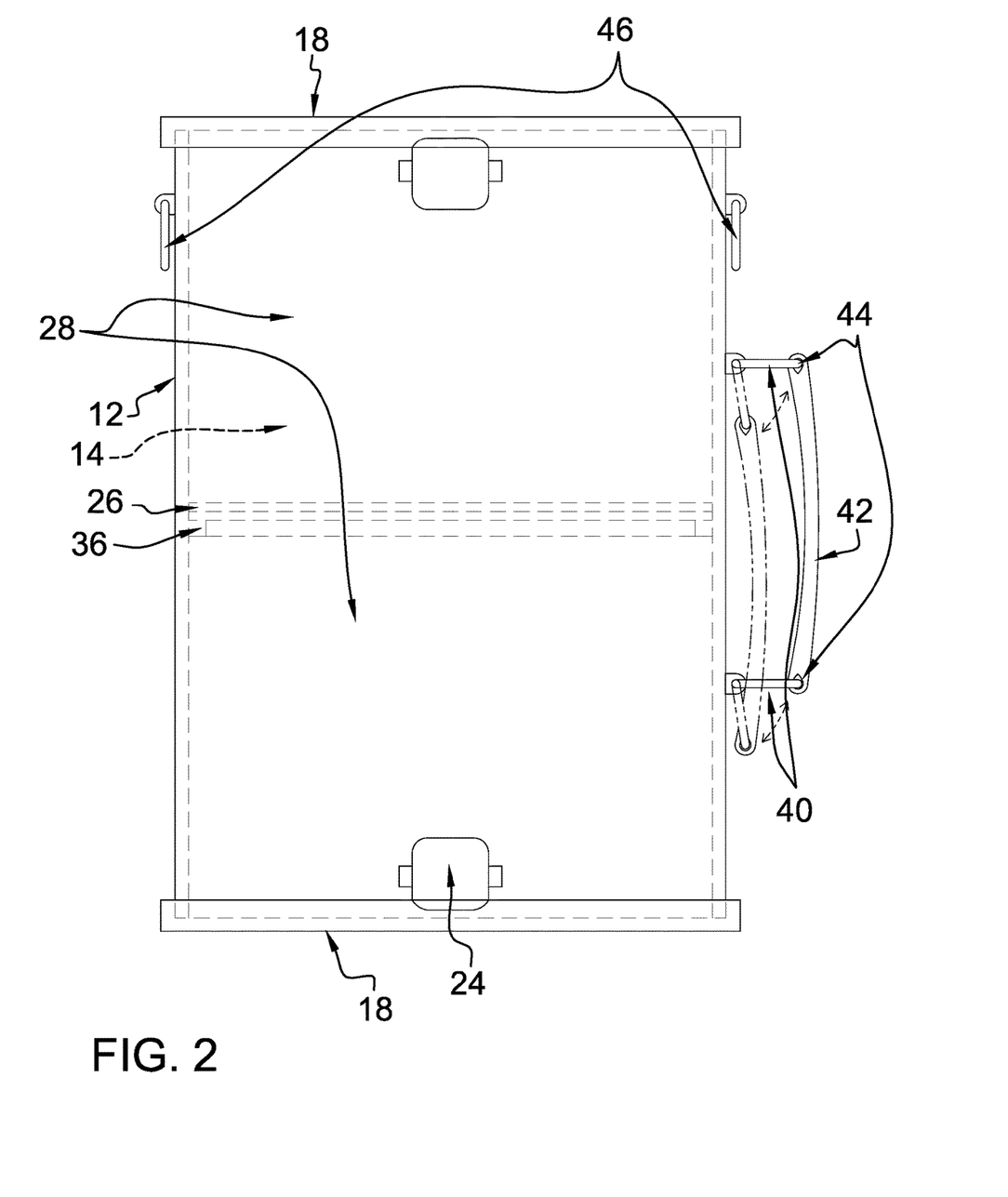
FIG. 2 is a front view of an embodiment of the disclosure.
Figure 3:
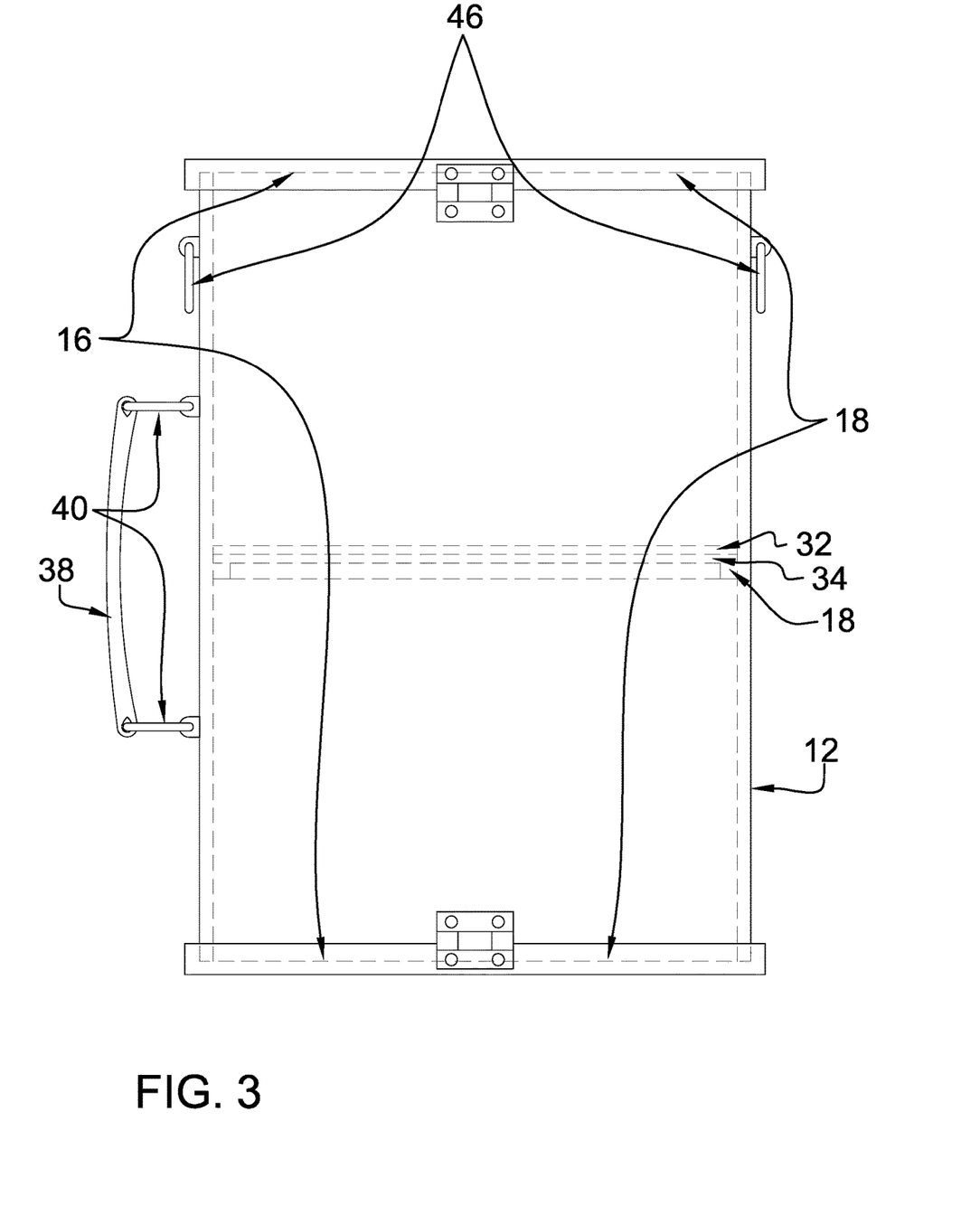
FIG. 3 is a rear view of an embodiment of the disclosure.
Figure 4:
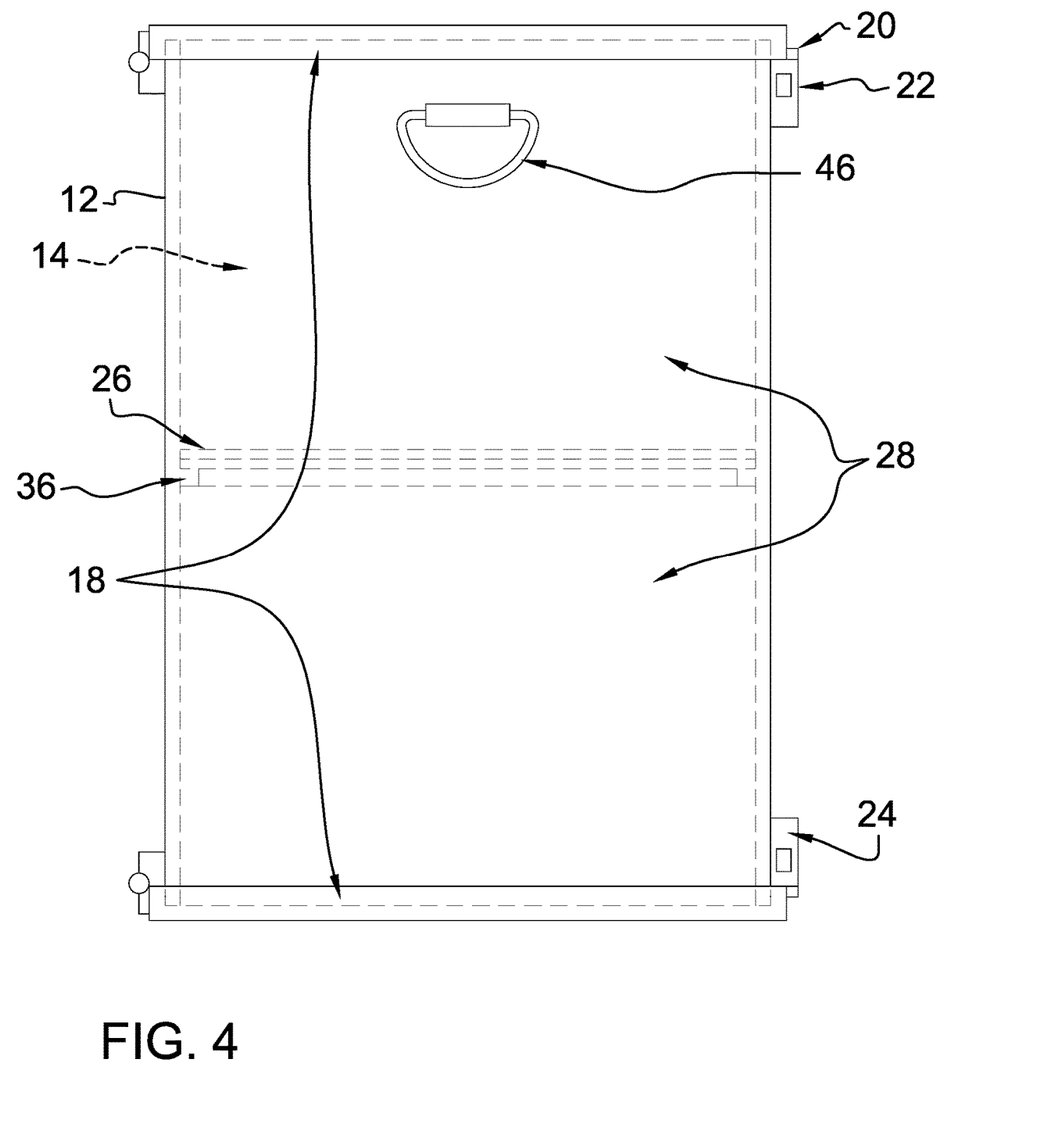
FIG. 4 is a first side view of an embodiment of the disclosure.
Figure 5:
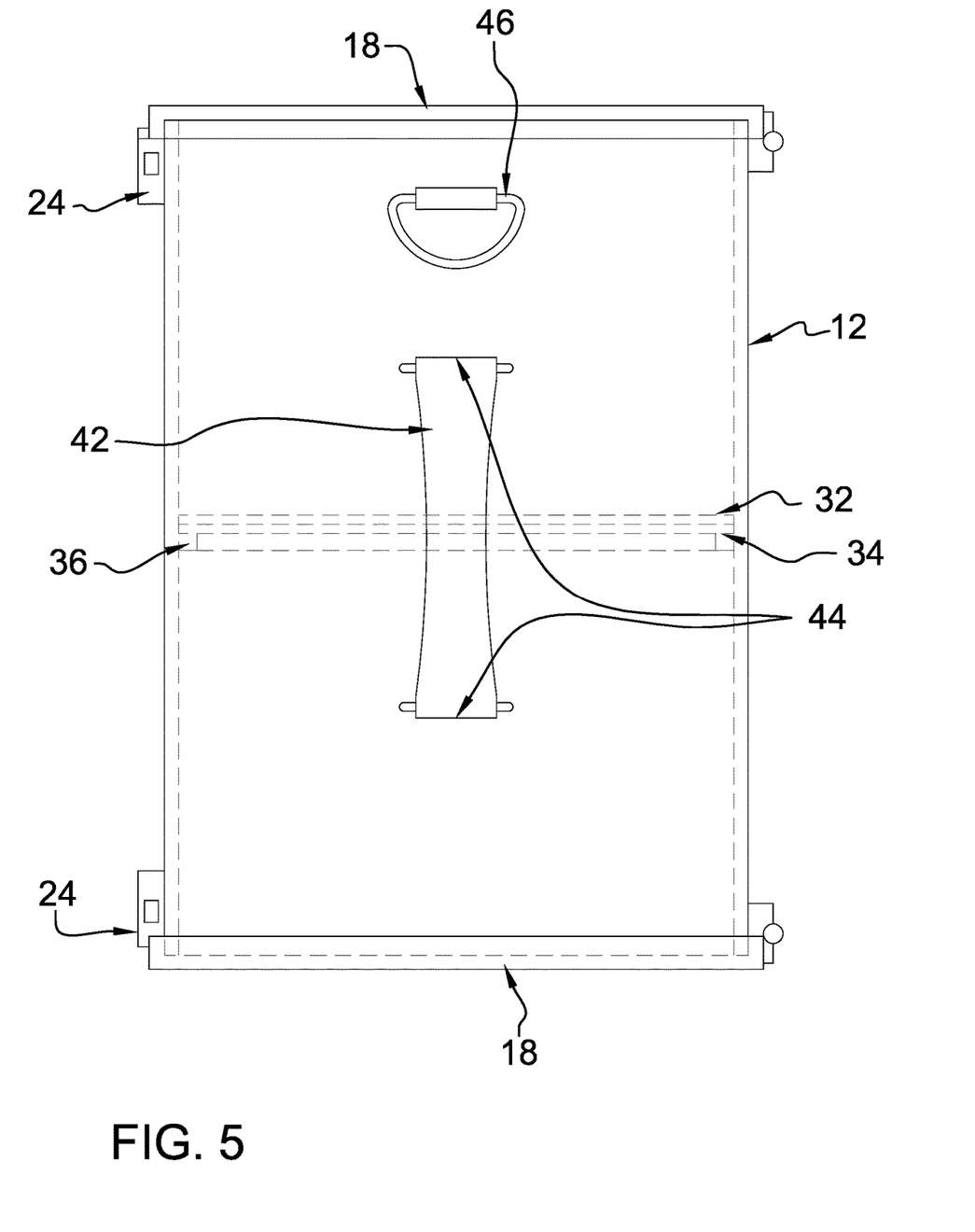
FIG. 5 is a second side view of an embodiment of the disclosure.
Figure 6:
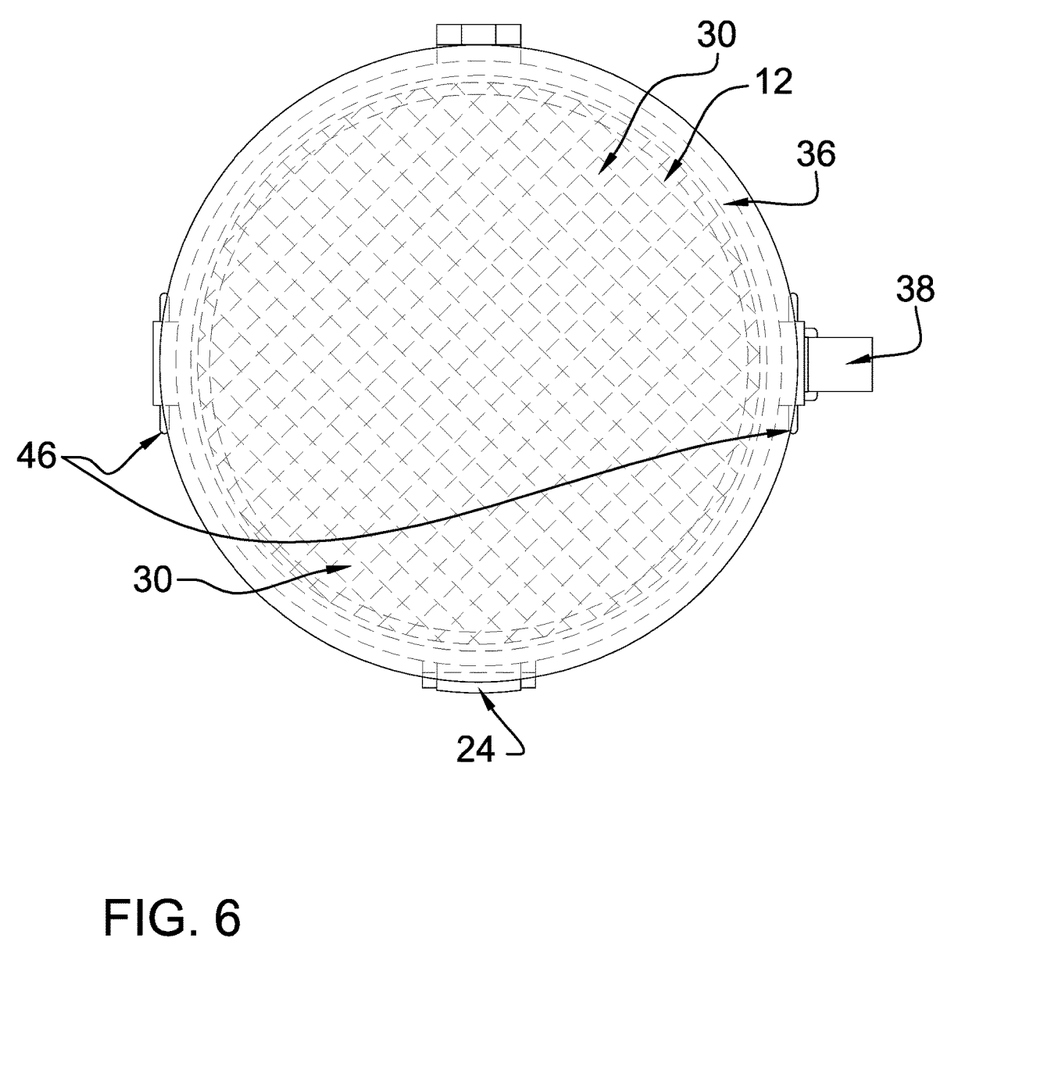
FIG. 6 is a top view of an embodiment of the disclosure.
Figure 7:
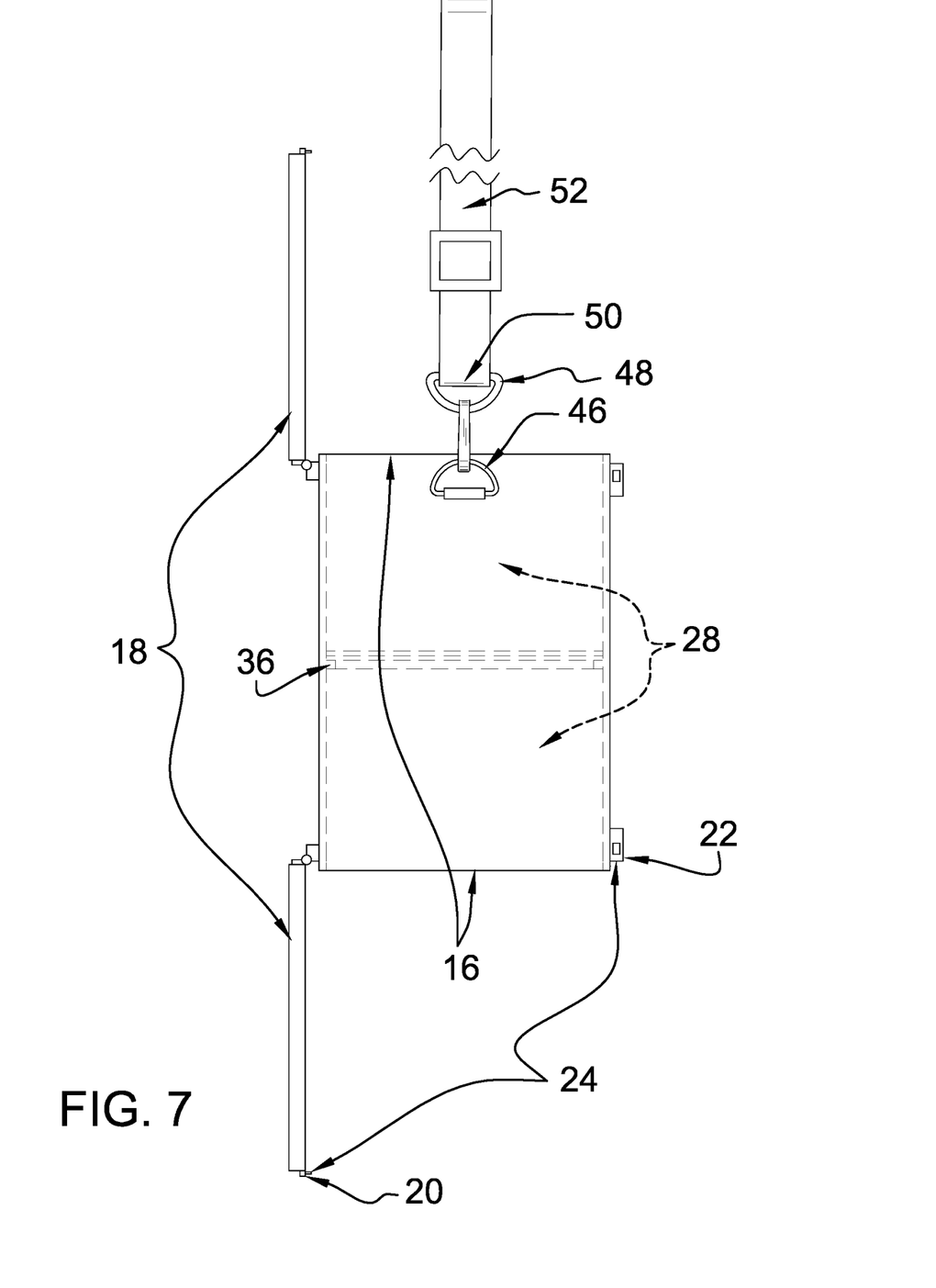
FIG. 7 is a detail view of an embodiment of the disclosure.

Each of a pair of lids 18 is hingedly engaged to a respective opposed end 16 of the tube 12. The lid 18 is selectively engageable to the tube 12 to close the respective opposed end 16. Each lid 18 has a first fastener 20 engaged thereto. The first fastener 20 is complementary to a second fastener 22, which is engaged to the tube 12. The first fastener 20 is positioned to selectively engage the second fastener 22 to removably secure the lid 18 to the tube 12 to close an associated opposed end 16 thereof. The first fastener 20 and the second fastener 22 may comprise a latch 24, as shown in FIG. 2, or other fastening means, such as, but not limited to, clasps, screw tops, and the like. The latch 24 may be spring loaded.

A grate 26 engaged to the tube 12 defines a pair of compartments 28 within the interior space 14. The grate 26 is configured to sift worms from dirt positioned in one of the compartments 28 upon inversion of the tube 12.

Figure 1:
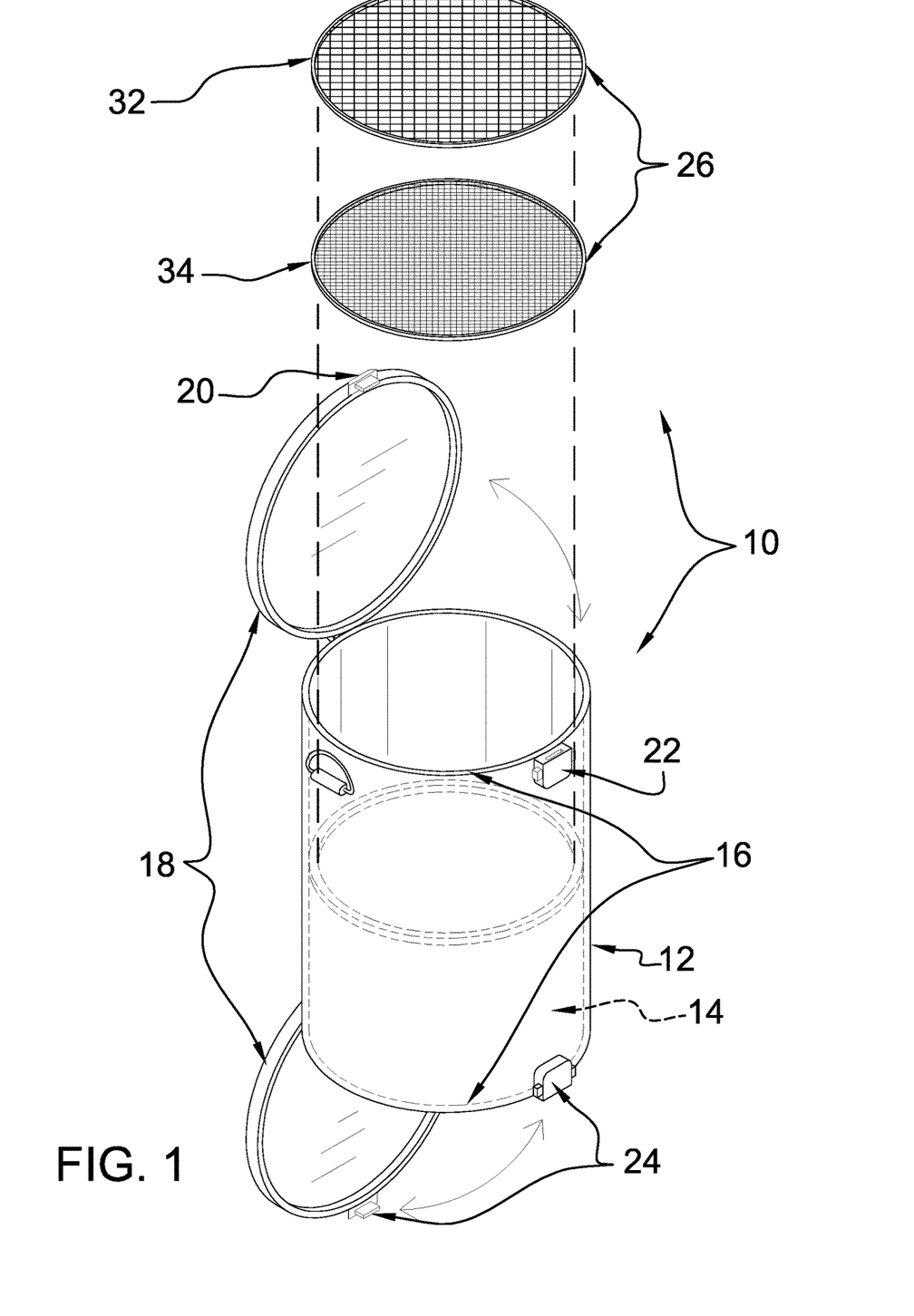
FIG. 1 is an isometric perspective view of a bait container assembly according to an embodiment of the disclosure.

The grate 26 is selectively engageable to the tube 12, as shown in FIG. 1, so that the grate 26 is selectively removable therefrom. The grate 26 is one of a set of grates 26. Each grate 26 of the set of grates 26 has a respective mesh size 30 so that the set of grates 26 comprises grates 26 having a variety of mesh sizes 30. A respective grate 26 is selectively engageable to the tube 12 to sift worms of an associated size. Having grates 26 of a variety of mesh sizes 30 allows the user to select a grate 26 having a mesh size 30 appropriate for the worms that are positioned in the tube 12.

The set of grates 26 comprises a first grate 32, which has a mesh size 30 of 1.27 centimeters, and a second grate 34, which has a mesh size 30 of 0.64 centimeters. The first grate 32 is configured to retain large worms thereupon and the second grate 34 is configured to retain large and small worms thereupon.

A ridge 36 is engaged to the tube 12 and positioned in the interior space 14. The ridge 36 is positioned to engage the grate 26 as the grate 26 is inserted into the tube 12. The ridge 36 is positioned substantially equally distant from the opposed ends 16 of the tube 12 so that the compartments 28 are substantially volumetrically equivalent. The compartments 28 being substantially volumetrically equivalent permits a user to repeatedly invert the tube 12 to obtain a worm, as upon each inversion, the dirt passes from one compartment 28 to the other, with the worms being retained upon the grate 26. The worms traverse the grate 26 slowly and reenter the dirt.

A handle 38 is engaged to the tube 12 and is positioned perpendicularly to the opposed ends 16. The handle 38 is configured to be grasped in a hand of a user, positioning the user to invert the tube 12. The handle 38 comprises a pair of D-rings 40 and a bar 42. Each D-ring 40 is hingedly engaged to the bar 42 proximate to a respective opposed limit 44 thereof. The handle 38 is selectively positionable in a deployed configuration, wherein the bar 42 is distal from the tube 12, and a stowed configuration, wherein the bar 42 is positioned in substantial abutment with the tube 12.

A pair of strap rings 46 is engaged to the tube 12 proximate to a respective opposed end 16. Each strap ring 46 is configured to selectively engage a coupler 48 engaged to a respective opposing end 50 of a strap 52 to engage the strap 52 to the tube 12. The strap 52 can be positioned over a shoulder of the user to carry the tube 12 and contents thereof.

In use, the worms and dirt are positioned in one of the compartments 28 and a respective grate 26 is inserted so that it engages the ridge 36. When a worm is required, the user grasps the handle 38 and inverts the tube 12. The dirt passes through the grate 26, which retains the worms thereupon. The user opens a respective lid 18 to access a worm. The worms migrate through the grate 26 to reenter the dirt, positioning the user to again invert the tube 12 to obtain another worm, as required.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A bait container assembly comprising:
a tube defining an interior space and having opposed ends, the opposed ends being open;
a pair of lids, each lid being hingedly engaged to a respective opposed end of the tube, the lid being selectively engageable to the tube for closing the respective opposed end; and
a set of grates, each grate of the set of grates having a respective mesh size, such that the set of grates comprises grates having a variety of mesh sizes, wherein a respective grate is selectively engageable to the tube for sifting worms of an associated size, each grate when engaged to the tube defining a pair of compartments within the interior space, wherein each grate is configured for sifting worms from dirt positioned in one of the compartments upon inversion of the tube, wherein each grate is selectively engageable to the tube such that the grate is selectively removable from the tube.

2. The bait container assembly of claim 1, wherein the tube is cylindrical.

3. The bait container assembly of claim 1, wherein each lid has a first fastener engaged thereto, the first fastener being complementary to a second fastener engaged to the tube, such that the first fastener is positioned for selectively engaging the second fastener for removably securing the lid to the tube for closing an associated opposed end thereof.

4. The bait container assembly of claim 3, wherein the first fastener and the second fastener comprise a latch.

5. The bait container assembly of claim 4, wherein the latch is spring loaded.

6. The bait container assembly of claim 1, wherein the set of grates comprises a first grate having a mesh size of 1.27 centimeters and a second grate having a mesh size of 0.64 centimeters, wherein the first grate is configured for retaining large worms thereupon and the second grate is configured for retaining large and small worms thereupon.

7. The bait container assembly of claim 1, further including a ridge engaged to the tube and positioned in the interior space, such that the ridge is positioned for engaging the grate as the grate is inserted into the tube.

8. The bait container assembly of claim 7, wherein the ridge is positioned substantially equally distant from the opposed ends of the tube, such that the compartments are substantially volumetrically equivalent.

9. The bait container assembly of claim 1, further including a handle engaged to the tube and being positioned perpendicular to the opposed ends, wherein the handle is configured for grasping in a hand of a user, positioning the user for inverting the tube.

10. The bait container assembly of claim 9, wherein the handle comprises a pair of D-rings and a bar, each D-ring being hingedly engaged to the bar proximate to a respective opposed limit thereof, such that the handle is selectively positionable in a deployed configuration, wherein the bar is distal from the tube, and a stowed configuration, wherein the bar is positioned in substantial abutment with the tube.

11. The bait container assembly of claim 1, further including a pair of strap rings engaged to the tube proximate to a respective opposed end, wherein each strap ring is configured for selectively engaging a coupler engaged to a respective opposing end of a strap for engaging the strap to the tube.

12. A bait container assembly comprising:

a tube defining an interior space and having opposed ends, the opposed ends being open, the tube being cylindrical;

a pair of lids, each lid being hingedly engaged to a respective opposed end of the tube, the lid being selectively engageable to the tube for closing the respective opposed end;

each lid having a first fastener engaged thereto, the first fastener being complementary to a second fastener engaged to the tube, such that the first fastener is positioned for selectively engaging the second fastener for removably securing the lid to the tube for closing an associated opposed end thereof, the first fastener and the second fastener comprising a latch, the latch being spring loaded;

a set of grates, each grate of the set of grates having a respective mesh size, such that the set of grates comprises grates having a variety of mesh sizes, wherein a respective grate is selectively engageable to the tube for sifting worms of an associated size, each grate when engaged to the tube defining a pair of compartments within the interior space, wherein each grate is configured for sifting worms from dirt positioned in one of the compartments upon inversion of the tube, each grate being selectively engageable to the tube such that each grate is selectively removable from the tube, the set of grates comprising a first grate having a mesh size of 1.27 centimeters and a second grate having a mesh size of 0.64 centimeters, wherein the first grate is configured for retaining large worms thereupon and the second grate is configured for retaining large and small worms thereupon;

a ridge engaged to the tube and positioned in the interior space, such that the ridge is positioned for engaging the grate as the grate is inserted into the tube, the ridge being positioned substantially equally distant from the opposed ends of the tube, such that the compartments are substantially volumetrically equivalent;

a handle engaged to the tube and being positioned perpendicular to the opposed ends, wherein the handle is configured for grasping in a hand of a user, positioning the user for inverting the tube, the handle comprising a pair of D-rings and a bar, each D-ring being hingedly engaged to the bar proximate to a respective opposed limit thereof, such that the handle is selectively positionable in a deployed configuration, wherein the bar is distal from the tube, and a stowed configuration, wherein the bar is positioned in substantial abutment with the tube; and a pair of strap rings engaged to the tube proximate to a respective opposed end, wherein each strap ring is configured for selectively engaging a coupler engaged to a respective opposing end of a strap for engaging the strap to the tube.

\* \* \* \* \*